G. H. ROBERTS.
PIG OPERATING TABLE.
APPLICATION FILED AUG. 12, 1914.
1,181,615.
Patented May 2, 1916.
2 SHEETS—SHEET 1.
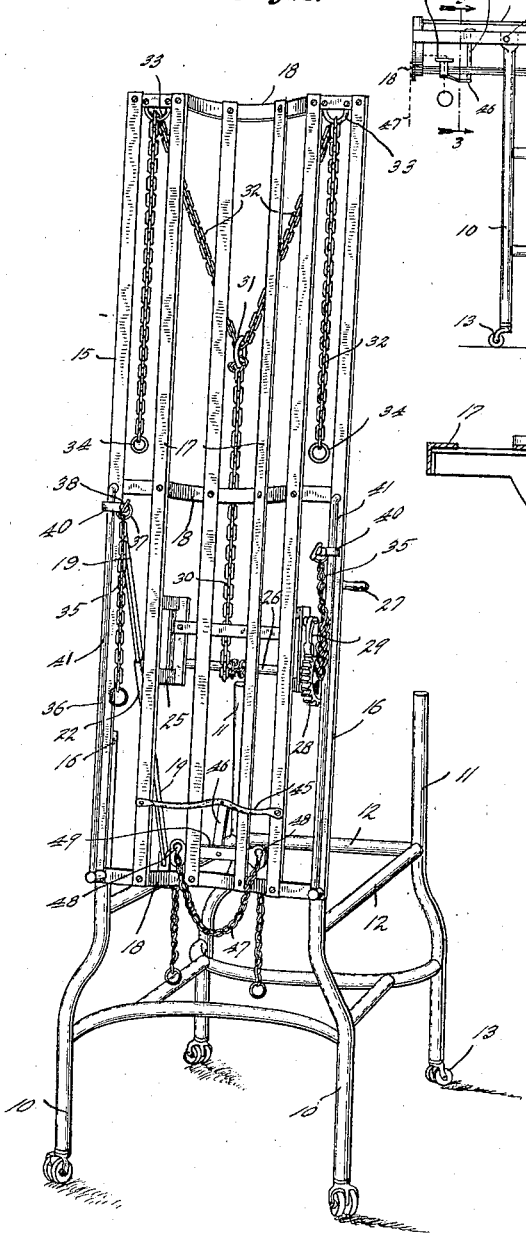
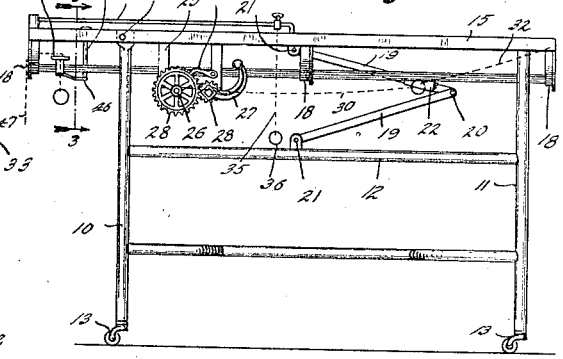
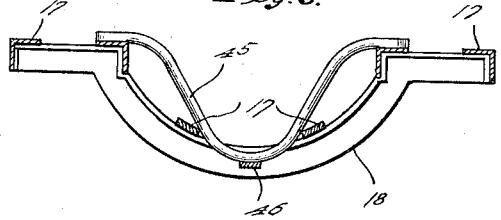
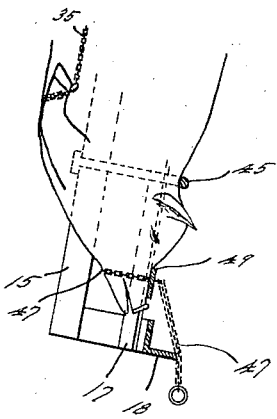
WITNESSES:
Frank A. Sahle
Louise Bennett
INVENTOR
George H. Roberts,
BY
Hood Schley.
ATTORNEYS G. H. ROBERTS.
PIG OPERATING TABLE.
APPLICATION FILED AUG. 12, 1914.
1,181,615.
Patented May 2, 1916.
2 SHEETS—SHEET 2.
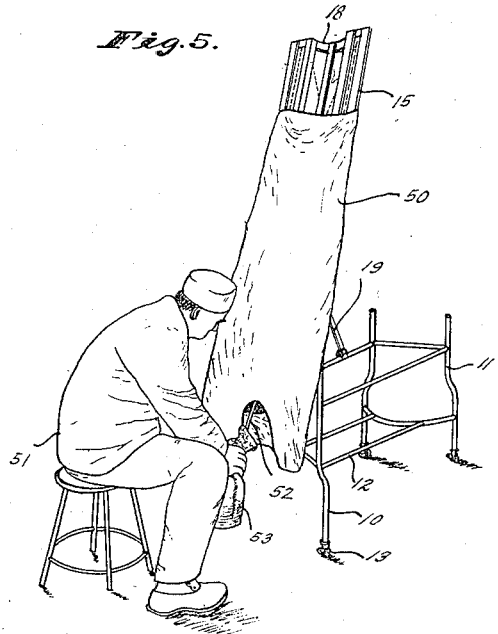
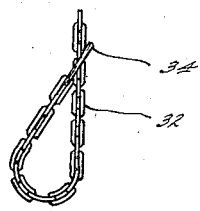
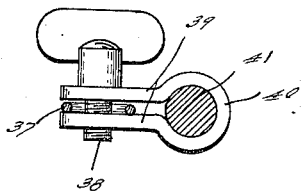
WITNESSES:
Frank A. Fahle
Louise Bennett
INVENTOR
George H. Roberts,
BY
ATTORNEYS

UNITED STATES PATENT OFFICE.

GEORGE H. ROBERTS, OF INDIANAPOLIS, INDIANA, ASSIGNOR TO PITMAN-MOORE COMPANY, OF INDIANAPOLIS, INDIANA, A CORPORATION OF INDIANA.

PIG OPERATING-TABLE.

1,181,615.    Specification of Letters Patent.    Patented May 2, 1916.

Application filed August 12, 1914. Serial No. 856,482.

*To all whom it may concern:*

Be it known that I, GEORGE H. ROBERTS, a citizen of the United States, residing at Indianapolis, in the county of Marion and State of Indiana, have invented a new and useful Pig Operating-Table, of which the following is a specification.

My invention relates to operating tables for animals and particularly for pigs, either virus or hyperimmune, which have been treated to produce the desired virus or the desired serum in the blood and from which the blood is about to be drawn by the large blood vessels in the neighborhood of the jugular confluent.

The object of my invention is to provide an operating table which will hold the pig or other animal quiet and in proper position to have the blood most easily and completely drawn from it by way of these large blood vessels; is adjustable to animals of different sizes; may be horizontal while the animal is being placed upon it but may be tilted to bring the animal into an upright position with its head downward and its throat exposed in the most advantageous position for bleeding; and is stable at all times.

The accompanying drawings illustrate my invention.

Figure 1 is a perspective view of my pig operating table, showing the animal bed raised; Fig. 2 is a side elevation of said operating table on a somewhat smaller scale, showing the animal bed lowered; Fig. 3 is an enlarged sectional view on the line 3—3 of Fig. 2, showing the ear piece; Fig. 4 is a partial section showing how the animal's head is held in position for operating; Fig. 5 is a perspective view showing the table in use, with blood being drawn from a pig's jugular confluent; Fig. 6 is a detail view of a fastening slip loop used in the various chains; and Fig. 7 is a detail view of the clamp for one of the fore-leg chains.

The base frame preferably comprises two uprights 10 and two uprights 11 suitably connected by horizontals 12 and conveniently provided with casters 13 at their lower ends. The animal bed 15 has a pivotal connection 16 with the upper ends of the two uprights 10, so that it may be tilted from the horizontal position shown in Fig. 2 to the upright or substantially vertical position shown in Figs. 1 and 5. When in its horizontal position, the animal bed rests on the upper ends of the uprights 11. The animal bed projects or overhangs beyond the pivotal point 16 a considerable distance, perhaps one-sixth ($\frac{1}{6}$) of its total length, so that this overhanging part will descend as the other part is tilted upward from the position shown in Fig. 2 to the position shown in Fig. 1. The animal bed is made of a series of spaced longitudinals 17, cross-connected by several cross pieces 18, which are conveniently angle irons having straight ends and a concave or hollow middle portion, the longitudinals 17 being suitably fastened, as by rivets, to the cross pieces 18. As some of the longitudinals are in the hollow portions of the cross pieces 18, the bed as a whole has a longitudinal groove extending from one end to the other and two flat portions at the sides of this groove, the groove serving to receive the animal's body. Two links 19 have a pivotal connection 20 with each other and pivotal connections 21 with the animal bed 15 and one of the side horizontals 12 of the base frame, the two links 19 being at an angle with each other when the animal bed is horizontal but being brought into alinement when the animal bed is raised as shown in Fig. 1, thus limiting the upward movement of such animal bed. A sliding sleeve 22 is slidably mounted on the upper link 19 so that when the two links are brought into alinement it may be slid down over the joint 20 to hold them in alinement, so that the two links 19 will together act as a brace for holding the animal bed 16 upright. When it is desired to lower the animal bed the sleeve 22 is slid upward away from the joint 20, thus allowing the two links to be moved out of alinement to permit the animal bed to descend.

Mounted on the under side of the animal bed 16 on suitable supports 25 is a windlass 26, having an operating handle 27 connected to it by a gear and pinion connection 28, a locking pawl 29 being provided for preventing undesired backward movement of the windlass. The windlass has its chain 30 terminating in a ring 31, through which slidably extends a chain 32, the chain 32 on the two sides of the ring 31 also passing through rings 33 secured to that end of the animal bed 16 which is uppermost when the animal bed is raised. The two ends of the chain 32 are provided with rings 34, through which the chain itself may be slipped to form slip loops as shown in Fig. 6. These slip loops at the two ends of the chain 32 are to receive the two hind legs of the animal, and by slipping grasp such legs firmly, whereby by turning the windlass 26 the animal may be moved along the animal bed, either by drawing it toward the upper end (Fig. 1) when the animal bed is in either its horizontal or vertical position or by allowing it to slide downward toward the lower end when the animal bed is in its vertical position, to bring the animal to the desired position. The chain 32 slips through the ring 31 as this is done to equalize the pull on the animal's two hind legs. In order to hold the animal's fore-legs a short chain 35 is provided at each side, this chain also being provided with a ring 36, similar to the ring 34, at its free end, and at the other end with a ring 37 which fits loosely over the clamping screw 38 between the two arms 39 of a clamping member 40 mounted on a slide rod 41 extending along each side of the animal bed 16 from about the middle to the end which is lowermost when the animal bed is upright. Slip loops are formed in the chains 35, similar to those formed in the chain 32 as already stated, and these slip loops in the chains 35 are placed around the animal's fore-legs and tightened, the clamps 40 being clamped in position after having been slid along the rods 41 to draw the chains 35 tight with the animal's fore-legs in proper position. Near that end of the animal bed 16 which is lowermost when the animal bed is upright is fastened an ear piece 45, which is made of a heavy metal rod curved as shown in Fig. 3 and fastened to the longitudinals 17 of the animal bed, and if desired to a supplemental bracing piece 46 carried by the middle two of said longitudinals so as to support the ear piece at its center. This ear piece fits around the back of the animal's neck or head just behind the ears, as shown in Fig. 4, so as to prevent the entire animal from being drawn out of proper position either by its contortions or by the turning of the windlass 26. The back of the animal's neck is held firmly against the ear piece 45 by a chin chain 47, the two ends of which pass through holes 48 in a supplemental cross piece 49 on the animal bed 16, the holes 48 each being in the shape of an ordinary key hole with the portion which is at the top when the animal bed is upright sufficiently large to permit the free passage of the chain 47 but with the narrow lower portion sufficiently narrow to prevent the chain from sliding through though sufficiently wide to receive a single link of the chain when inserted edgewise. This permits the chain 47 when placed around the animal's chin to be drawn tight through the larger portion of one of the holes 48 to draw the animal's nose against the supplemental cross piece 49, a link of the chain then being slid down into the narrower portion of the slot 48 so as to hold the chain in this tight position and thus prevent the animal from moving its head.

In the use of the operating table, the animal, after having first been properly treated so that it has developed in its blood either such virus or such serum as is desired, is placed on its back in the longitudinal groove of the animal bed while the latter is in horizontal position, with its head over the ear piece 45, and the hind leg chains 32, foreleg chains 35, and chin chain 47 are fastened in place as above described. Then the animal bed is tilted to upright position, and the windlass 26 adjusted further if necessary to bring the animal's body to the proper position. A shroud 50 is placed over the animal either before or after the animal bed is brought to upright position, though leaving the animal's throat exposed. The animal is now head downward, with his throat forward, the center of gravity of the animal being behind the uprights 10 of the base frame because of the longitudinal groove in the animal bed, so that there is no danger of having the device tilt over by reason of the weight of the animal. The animal's throat has also been slightly lowered from the position in which it was when the animal bed was horizontal, because such head is on the overhanging part of the animal bed, so that it is rendered more easily accessible to the operator 51. The operator now by a quick thrust inserts into the large blood vessels in the neighborhood of the animal's jugular confluent, by piercing its throat, a final bleeding knife 52, which by cutting such vessels produces a free flow of blood and is preferably provided with a hollow handle through which the blood from the animal drains by gravity into a receiving receptacle 53 which the operator holds in proper position. As this final bleeding knife forms no part of my present invention it is unnecessary to describe it in detail here. When the blood is all drawn from the animal's body, for proper subsequent treatment, the animal bed 16 is returned to its horizontal position, and the now dead animal removed therefrom.

I claim as my invention:—

1. An animal operating table, comprising the combination of a base frame, and an animal bed pivoted to one end of said frame and tiltable to either horizontal or upright position, said animal bed having one end which overhangs beyond the pivotal connecting point with the base frame so that it is lowered as the remainder of the animal bed is raised to upright position, and being provided with a groove transverse to its pivotal axis on the table and extending in both directions from such pivotal axis for receiving the animal's back so that its head is on said overhanging end and its throat exposed.

2. In an animal operating table, the combination of an animal bed tiltable to vertical position, means at the upper end of the animal bed for fastening the animal's hind legs for supporting it on the animal's bed, an ear piece near the lower end of the animal bed for fitting around the back of the animal's neck behind the ears, and a chain near the lower end of the animal bed for passing under the animal's chin to draw its head back against said ear piece.

3. In an animal operating table, the combination of an animal bed, a windlass carried by said animal bed and provided with chain ends for attachment to the animal's hind legs, said chain ends being at opposite ends of a chain the middle of which has a sliding connection with a chain passing to the windlass drum so as to allow the pull on the chain ends to equalize itself, and an ear piece for fitting over the back of the animal's neck behind the ears for preventing it from being drawn out of proper position by the operation of the windlass.

4. In an animal operating table, the combination of an animal bed tiltable to vertical position, a windlass carried by said animal bed and provided with chain ends supported near the upper end of the animal bed for attachment to the animal's hind legs, and an ear piece near the lower end of the animal bed for fitting over the back of the animal's neck behind the ears for preventing it from being drawn out of proper position by the operation of the windlass.

5. In an animal operating table, the combination of an animal bed, and a windlass carried by said animal bed and provided with chain ends for attachment to the animal's hind legs, said chain ends being at opposite ends of a chain the middle of which has a sliding connection with a chain passing to the windlass drum so as to allow the pull on the chain ends to equalize itself.

6. In an animal operating table, the combination of an animal bed tiltable to vertical position, a windlass carried by said animal bed and provided with chain ends supported near the upper end of the animal bed for attachment to the animal's hind legs, an ear piece near the lower end of the animal bed for fitting over the back of the animal's neck behind the ears for preventing it from being drawn out of proper position by the operation of the windlass, and a chain still nearer the lower end of the animal bed than said ear piece for passing under the animal's chin for holding the back of its neck firmly against said ear piece.

7. An animal operating table, comprising the combination of a base frame, and an animal bed pivoted thereto so as to be swung to either horizontal or upright position, said animal bed being provided with a longitudinal groove transverse to the pivotal axis of said animal bed for receiving the animal's back and with flat portions flanking such groove.

8. An animal operating table, comprising the combination of a base frame, and an animal bed pivoted thereto so as to be swung to either horizontal or upright position, said animal bed comprising a plurality of spaced longitudinals extending transversely of the pivotal axis of the animal bed and mounted on a plurality of cross pieces, and said cross pieces being curved so that the longitudinals supported thereby form a groove for receiving the animal's back.

9. In an animal operating table, the combination of an animal bed having a trough for receiving the animal's body, means at one end of such animal bed for fastening the animal's hind legs, chains provided with slip loops at their ends for fastening the animal's fore legs, clamping members on which said chains are mounted, and slide rods near the other end of the animal bed from that on which the first fastening means is mounted and extending parallel to the trough and on which said clamping members are longitudinally slidable and upon which they may be clamped in any desired position.

In witness whereof, I have hereunto set my hand at Indianapolis, Indiana, this 20th day of July, A. D. one thousand nine hundred and fourteen.

GEORGE H. ROBERTS.

Witnesses:
G. B. SCHLEY,
FRANK A. FAHLE.

Copies of this patent may be obtained for five cents each, by addressing the "Commissioner of Patents, Washington, D. C."